US010156778B2

(12) United States Patent
Shinohara

(10) Patent No.: US 10,156,778 B2
(45) Date of Patent: Dec. 18, 2018

(54) DISPLAY DEVICE FOR PROJECTING IMAGE IN MIDAIR USING LIGHT GUIDE PLATE

(71) Applicant: OMRON Corporation, Kyoto-shi, Kyoto (JP)

(72) Inventor: Masayuki Shinohara, Kyoto (JP)

(73) Assignee: OMRON Corporation, Kyoto-shi (JP)

(*) Notice: Subject to any disclaimer, the term of this patent is extended or adjusted under 35 U.S.C. 154(b) by 0 days.

(21) Appl. No.: 15/537,160

(22) PCT Filed: Feb. 23, 2017

(86) PCT No.: PCT/JP2017/006928
§ 371 (c)(1),
(2) Date: Jun. 16, 2017

(87) PCT Pub. No.: WO2017/146172
PCT Pub. Date: Aug. 31, 2017

(65) Prior Publication Data
US 2018/0101087 A1  Apr. 12, 2018

(30) Foreign Application Priority Data
Feb. 24, 2016  (JP) .................................. 2016-033002

(51) Int. Cl.
G03B 21/14      (2006.01)
G02B 6/00       (2006.01)
(Continued)

(52) U.S. Cl.
CPC ............. *G03B 21/147* (2013.01); *G02B 6/00* (2013.01); *G02B 6/003* (2013.01); *G02B 6/0031* (2013.01);
(Continued)

(58) Field of Classification Search
CPC ...... G03B 21/28; G03B 21/147; G02B 6/003; G02B 6/0031; G02B 6/0038;
(Continued)

(56) References Cited

U.S. PATENT DOCUMENTS 9,250,445 B2 *  2/2016  Tosaya ............... G02B 27/0172
2004/0032659 A1 *  2/2004  Drinkwater ........... F21V 33/006
359/558
(Continued)

FOREIGN PATENT DOCUMENTS

CN  103939790 A  7/2014
CN  104503087 A  4/2015
(Continued)

OTHER PUBLICATIONS

Written Opinion of the International Searching Authority dated May 23, 2017 in PCT international application, PCT/JP2017/006928 (English translation of the Written Opinion will be issued and uploaded to Patentscope of WIPO.).
(Continued)

Primary Examiner — Sultan Chowdhury
(74) Attorney, Agent, or Firm — Metrolexis Law Group, PLLC

(57) ABSTRACT

A display device includes an image projection device, a light guide plate, and a mask. The light guide plate includes deflectors arranged in a propagation direction of a light beam emitted from the image projection device and entering the light guide plate. Each deflector causes light beams to be emitted from an outgoing surface at angles different from each other in the propagation direction, the light beams emitted from locations different from each other or emitted in directions different from each other in a direction orthogonal to the longer direction of an incident surface in a displayed region of the image projection device. The mask
(Continued)

shuts-off light beams other than a light beam directed toward a predetermined viewpoint among light beams emitted from the outgoing surface. The image projection device collimates light beams emitted from the region, in the direction orthogonal to the longer direction of the incident surface.

20 Claims, 11 Drawing Sheets

(51) Int. Cl.
  *F21V 8/00* (2006.01)
  *G02B 27/30* (2006.01)
  *G03B 21/28* (2006.01)
  *G03B 35/24* (2006.01)
  *G02B 27/22* (2018.01)
(52) U.S. Cl.
  CPC ......... *G02B 6/0038* (2013.01); *G02B 6/0051* (2013.01); *G02B 6/0053* (2013.01); *G02B 27/2214* (2013.01); *G02B 27/30* (2013.01); *G03B 21/28* (2013.01); *G03B 35/24* (2013.01)
(58) Field of Classification Search
  CPC .... G02B 6/0051; G02B 6/0053; G02B 27/30; G02B 27/0081; G02B 27/0101; G02B 27/0172
  See application file for complete search history.

(56) References Cited

U.S. PATENT DOCUMENTS

| | | | |
|---|---|---|---|
| 2007/0216871 A1* | 9/2007 | Yoshikawa | G03B 21/16 353/30 |
| 2010/0289986 A1* | 11/2010 | Shikii | G02B 6/0028 349/65 |
| 2010/0321781 A1 | 12/2010 | Levola et al. | |
| 2011/0310491 A1 | 12/2011 | Takagi et al. | |
| 2014/0268327 A1 | 9/2014 | Dunn et al. | |
| 2016/0150221 A1 | 5/2016 | Lee et al. | |

FOREIGN PATENT DOCUMENTS

| | | |
|---|---|---|
| CN | 104791655 A | 7/2015 |
| CN | 105629369 A | 6/2016 |
| JP | 2007-240965 A | 9/2007 |
| JP | 2011-113695 A | 6/2011 |
| JP | 2011-186332 A | 9/2011 |
| JP | 2014-98873 A | 5/2014 |
| WO | 2013056742 A1 | 4/2013 |
| WO | 2014/077032 A1 | 5/2014 |

OTHER PUBLICATIONS

The Chinese Office Action dated Apr. 18, 2018 in a counterpart Chinese Patent application.
A (translated) German Office Action (DEOA) dated Feb. 2, 2018 in a counterpart German patent application.

* cited by examiner

DISPLAY DEVICE FOR PROJECTING IMAGE IN MIDAIR USING LIGHT GUIDE PLATE

TECHNICAL FIELD

The present invention relates to a display device which can project an image in midair.

BACKGROUND ART

Conventionally, display devices which each project an image in midair have been studied. In particular, from among these display devices, a display device is proposed which transmits an image to be projected in midair by using a light guide plate in order to make the image projected in midair visible simultaneously with another object (for example, see Patent Document 1).

For example, the display device disclosed in Patent Document 1 includes an emission mechanism which includes: a display element that emits image display light and an optical system that forms a virtual image of an observation target; and a light guide. The light guide is a substrate. The light guide includes a first surface, a second surface opposite to the first surface, a third surface which is neither the first surface nor the second surface, and an outgoing surface arranged in front of the eyes of an observer. The outgoing surface includes a plurality of beam splitters each having a planer shape. This display device causes image display light from the emission mechanism to enter the inside of the substrate of the light guide via the third surface. Then, the display device guides the image display light in a setting direction by means of the first surface and the second surface, and guides the image display light from the outgoing surface to the eyes of the observer.

PRIOR ART DOCUMENT

Patent Document

Patent Document 1: Japanese Unexamined Patent Publication No. 2011-186332

SUMMARY OF THE INVENTION

Problems to be Solved by the Invention

However, with the display device disclosed in Patent Document 1, an observer observes a virtual image formed of image display light. This virtual image is located at an infinite distance from the observer. Since the virtual image is not formed at a finite distance, the observer is less likely to feel that the image is stereoscopic. In addition, in this display device, a range where a virtual image can be observed is limited to a range where the outgoing surface is provided. Since a virtual image is not formed near the light guide, the observer cannot observe the virtual image simultaneously at an identical location with both the eyes. In addition, a plurality of observers cannot observe the virtual image simultaneously at an identical location.

In view of the foregoing, an object of the present invention is to provide a display device which can widen the range of a viewpoint from which an image projected in midair can be viewed.

Means for Solving the Problem

A display device is provided as an aspect of the present invention. The display device includes an image projection unit, a light guide plate, and a mask. The image projection unit has a display surface, and displays an image to be projected, on a predetermined region of the display surface. The light guide plate is formed of a transparent member and has a plate shape. The light guide plate includes an incident surface that faces the image projection unit, and a plurality of deflecting units. The plurality of deflecting units is arranged in a propagation direction of a light beam emitted from the predetermined region of the image projection unit and entering inside the light guide plate via the incident surface. Each of the plurality of deflecting units causes light beams to be emitted from an outgoing surface, which is one surface of the light guide plate, at angles different from each other in the propagation direction, the light beams emitted from locations differing from each other or emitted in directions differing from each other in a direction orthogonal to a longer direction of the incident surface in the predetermined region of the image projection unit. The mask is arranged to face the outgoing surface of the light guide plate. The mask shuts-off light beams other than light beams directed toward a predetermined viewpoint from among light beams emitted from the outgoing surface via each of the plurality of deflecting units. The image projection unit collimates light beams emitted from the predetermined region, in the direction orthogonal to the longer direction of the incident surface of the light guide plate.

In this display device, the image projection unit preferably includes: an image display unit and a collimating member. The image display unit has the display surface and displays the image to be projected on the predetermined region of the display surface. The collimating member is arranged between the image display unit and the incident surface of the light guide plate. The collimating member collimates the light beams emitted from the predetermined region of the image display unit, in the direction orthogonal to the longer direction of the incident surface.

In addition, the display device preferably further includes an image forming unit which forms an image of the light beams emitted from the predetermined region of the image projection unit, at a predetermined location in a direction parallel to the longer direction of the incident surface of the light guide plate.

In this case, the image forming unit is preferably a cylindrical lens arranged between the image projection unit and the incident surface of the light guide plate and having positive power in the longer direction of the incident surface.

In the display device, the mask preferably has a slit provided for each of the plurality of deflecting units, the slit allowing a light beam to pass through the slit, the light beam directed toward a predetermined viewpoint from the deflecting unit.

In this case, the mask preferably includes a diffusion unit which diffuses a light beam on a plane including the propagation direction and the normal line of the outgoing surface, the light beam passed through the slit corresponding to each of the plurality of deflecting units.

A display device is provided as another aspect of the present invention. The display device includes an image projection unit and a light guide plate. The image projection unit has a display surface, and displays an image to be projected, on a predetermined region of the display surface. The light guide plate is formed of a transparent member and has a plate shape. The light guide plate includes an incident surface that faces the image projection unit, and a plurality of deflecting units that is arranged in a propagation direction of a light beam emitted from the predetermined region of the image projection unit and entering inside the light guide plate via the incident surface. Each of the plurality of deflecting units causes light beams to be emitted from an outgoing surface of the light guide plate toward a predetermined viewpoint, the light beams emitted from locations differing from each other or emitted in directions differing from each other in a direction orthogonal to a longer direction of the incident surface in the predetermined region of the image projection unit. The image projection unit collimates light beams emitted from the predetermined region in the direction orthogonal to the longer direction of the incident surface of the light guide plate.

In this display device, the image projection unit preferably includes an image display unit and a collimating member. The image display unit has the display surface and displays the image to be projected, on the predetermined region of the display surface. The collimating member is arranged between the image display unit and the incident surface of the light guide plate. The collimating member collimates light beams emitted from the predetermined region of the image display unit, in the direction orthogonal to the longer direction of the incident surface of the light guide plate.

In this case, the display device preferably further includes an image forming unit. The image forming unit forms an image of the light beams emitted from the predetermined region of the image projection unit, at a predetermined location in a direction parallel to the longer direction of the incident surface of the light guide plate.

In addition, the image forming unit is preferably a cylindrical lens arranged between the image projection unit and the incident surface of the light guide plate, and having positive power in the longer direction of the incident surface.

Alternatively, the image forming unit preferably includes a plurality of lenses arranged between the image projection unit and the incident surface and arranged along the longer direction of the incident surface. Each of the plurality of lenses preferably has positive power in the longer direction of the incident surface.

In this case, the image projection unit preferably displays images representing an identical subject viewed from a predetermined viewpoint, in partial regions of the predetermined region on which an image to be projected is displayed, the partial regions corresponding to the plurality of lenses, respectively.

Alternatively, the image forming unit is preferably arranged to face the outgoing surface of the light guide plate, and retroreflects a light beam on a plane parallel to the outgoing surface, the light beam emitted from inside the light guide plate via the outgoing surface.

In the display device, each of the plurality of deflecting units is preferably a prism. The prism is provided on a surface opposite to the outgoing surface of the light guide plate. The prism includes a reflective surface which reflects a light beam propagating inside the light guide plate toward the outgoing surface. It is preferable that an angle between the reflective surface and the outgoing surface becomes greater as the deflecting unit is located farther from the incident surface.

In addition, the display device preferably further includes a lens array arranged to face the outgoing surface of the light guide plate. The lens array includes a first lens and a second lens for each of the plurality of deflecting units. The first lens is provided at a location where a light beam passes, the light beam emitted from a first partial region on the predetermined region of the image projection unit where the image to be projected is displayed, from among light beams emitted from the predetermined region of the image projection unit, changed in direction by each of the plurality of deflecting units and emitted from the outgoing surface. The second lens is provided at a location where a light beam passes, the light beam emitted from a second partial region on the predetermined region of the image projection unit, the second partial region differing from the first partial region in the direction orthogonal to the longer direction of the incident surface of the light guide plate. The first lens and the second lens preferably have power on a plane including the propagation direction of a light beam inside the light guide plate and a normal direction of the outgoing surface such that an imaging plane corresponding to an image displayed in the first partial region and an imaging plane corresponding to an image displayed on the second partial region differ from each other.

Alternatively, the display device preferably further includes a prism array arranged to face the outgoing surface of the light guide plate. The prism array includes a first prism and a second prism for each of the plurality of deflecting units. The first prism is provided at a location where a light beam passes, the light beam emitted from a first partial region on the predetermined region of the image projection unit where the image to be projected is displayed from among light beams emitted from the predetermined region of the image projection unit, changed in direction by each of the plurality of deflecting units and emitted from the outgoing surface. The second prism is provided at a location where a light beam passes, the light beam emitted from a second partial region on the predetermined region of the image projection unit, the second partial region differing from the first partial region in the direction orthogonal to the longer direction of the incident surface of the light guide plate. The direction of a refracting surface of the first prism and the direction of a refracting surface of the second prism are set such that an imaging plane corresponding to an image displayed on the first partial region and an imaging plane corresponding to an image displayed on the second partial region differ from each other.

A display device is provided as yet another aspect of the present invention. The display device includes an image projection unit and a light guide plate. The image projection unit has a display surface, and displays an image to be projected, on a predetermined region of the display surface. The light guide plate is formed of a transparent member and has a plate shape. The light guide plate includes an incident surface that faces the image projection unit, and a plurality of deflecting units. The plurality of deflecting units is arranged in a propagation direction of a light beam emitted from the predetermined region of the image projection unit and entering inside the light guide plate via the incident surface. Each of the plurality of deflecting units causes light beams to be emitted from an outgoing surface of the light guide plate toward a predetermined viewpoint, the light beams emitted from locations differing from each other or emitted in directions differing from each other in a direction orthogonal to a longer direction of the incident surface, in the predetermined region of the image projection unit. Each of the plurality of deflecting units converges light beams in a direction parallel to the longer direction of the incident surface, the light beams emitted from the predetermined region of the image projection unit, and forms an image of the light beams at a predetermined location. The image projection unit is configured to collimate light beams emitted from the predetermined region, in the direction orthogonal to the longer direction of the incident surface of the light guide plate.

In this display device, the image projection unit preferably includes an image display unit and a collimating member. The image display unit has the display surface and displays the image to be projected, on the predetermined region of the display surface. The collimating member is arranged between the image display unit and the incident surface, and collimates the light beams emitted from the predetermined region of the image display unit, in the direction orthogonal to the longer direction of the incident surface of the light guide plate.

In the display device, each of the plurality of deflecting units is preferably a prism. The prism is provided on a surface of the light guide plate, opposite to the outgoing surface. The prism includes a reflective surface which reflects a light beam propagating inside the light guide plate, toward the outgoing surface. The reflective surface is formed to be concave with respect to the incident surface.

Alternatively, each of the plurality of deflecting units is preferably a prism. The prism is provided on a surface of the light guide plate, opposite to the outgoing surface. The prism includes a reflective surface formed to have a corner mirror shape. The reflective surface reflects a light beam propagating inside the light guide plate, toward the outgoing surface. The reflective surface retroreflects a light beam propagating inside the light guide plate on a plane parallel to the outgoing surface,.

Effect of the Invention

A display device according to the present invention exhibits an effect of widening the range of a viewpoint from which an image projected in midair can be viewed.

MODE FOR CARRYING OUT THE INVENTION

Hereinafter, a display device according to embodiments of the present invention will be described with reference to the drawings. The display device includes a light guide plate having a plate shape, and an image display device arranged to face an incident surface formed on one side wall of the light guide plate. An imaging lens and a collimating lens are arranged between the image display device and the incident surface. The imaging lens converges light beams from the image display device on a plane parallel to an outgoing surface of the light guide plate, which is a surface facing an observer. The collimating lens collimates light beams from the image display device on a plane orthogonal to the outgoing surface. Note that the image display device and the collimating lens configure an image projection unit. In addition, a plurality of prisms is formed on a diffusion surface of the light guide plate, the diffusion surface located opposite to the outgoing surface. The prism reflects a light beam entering inside the light guide plate from the image display device, toward the observer via the outgoing surface. Furthermore, a slit is provided between the outgoing surface and the observer and provided for each prism. The slit allows only a light beam to pass through the slit toward a specific viewpoint, the light beam emitted from a location on a display region of the image display device, the location corresponding to the corresponding prism in the direction orthogonal to the outgoing surface. Therefore, the imaging lens forms an image of light beams at one point in the direction parallel to the longer direction of the incident surface on a side closer to the observer with respect to the outgoing surface of the light guide plate, the light beams emitted from respective points on the display region of the image display device. The slits direct the light beams toward the specific viewpoint. Therefore, the observer can observe a projection image (real image) of an image displayed on the image display device as a set of image formation points corresponding to respective points on the display region. In addition, since light diffuses from an image formation point in a direction parallel to the longer direction of the incident surface, it is possible to give parallax in the direction. Therefore, when an observer is positioned such that the eyes of the observer are in parallel to the longer direction of the incident surface, the observer can stereoscopically observe a projection image, and can observe the projected image even when the observer moves the viewpoint along the direction.

Note that for the sake of description, the side facing an observer is hereinafter referred to as a front surface, and the side opposite to that is hereinafter referred to as a back surface.

Figure 1:
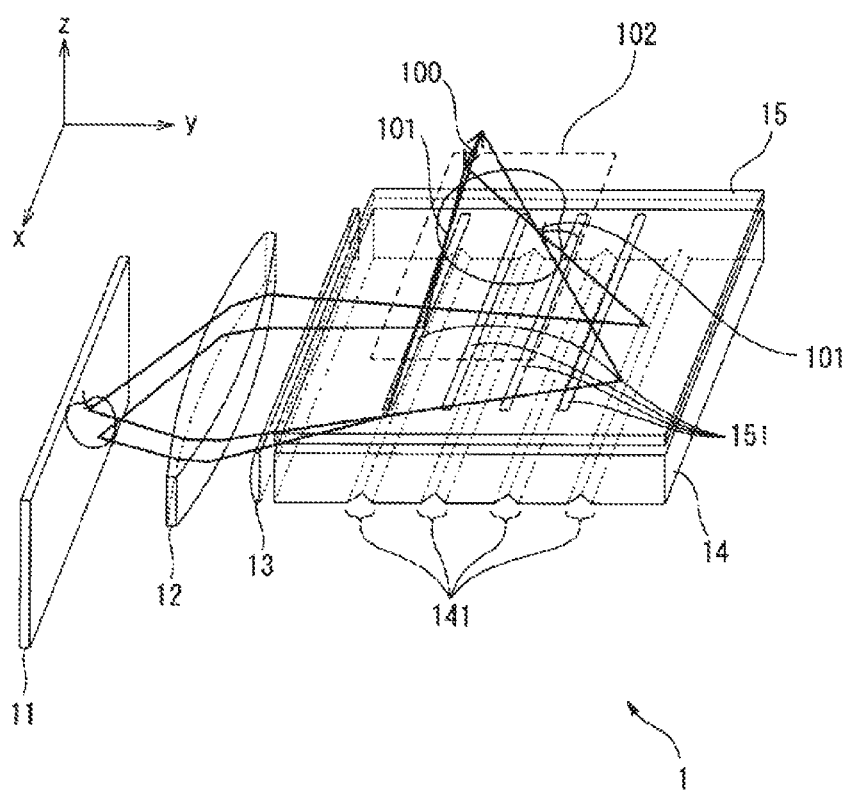
FIG. 1 is a schematic configuration diagram of a display device according to a first embodiment of the present invention.
Figure 2:
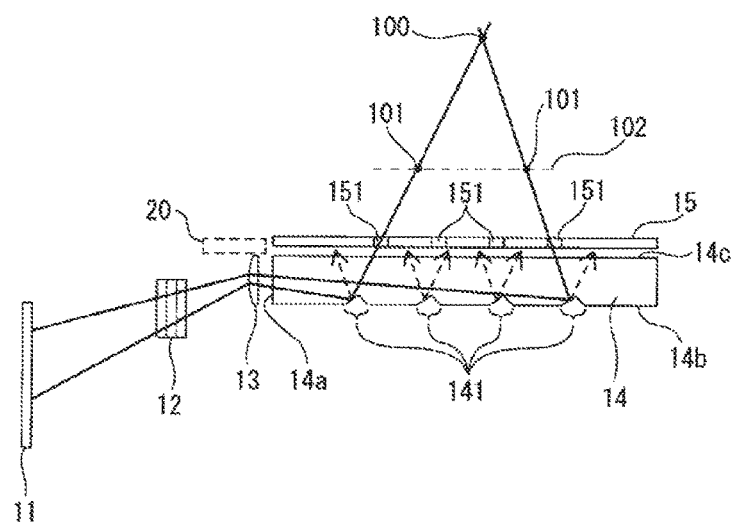
FIG. 2 is a schematic side view of the display device according to the first embodiment of the present invention.

FIG. 1 is a schematic configuration diagram of a display device according to one embodiment of the present invention. FIG. 2 is a schematic side view of the display device. The display device 1 includes an image display device 11, an imaging lens 12, a collimating lens 13, a light guide plate 14, and a mask 15. Note that, on a plane parallel to a diffusion surface 14b located on the back side of the light guide plate 14, the direction parallel to the longer direction of an incident surface 14a of the light guide plate 14 is hereinafter referred to as x direction and the normal direction of the incident surface 14a is hereinafter referred to as y direction. In addition, the normal direction of the diffusion surface 14b and an outgoing surface 14c located on the front side of the light guide plate 14 is hereinafter referred to as z direction. Note that each drawing hereinafter described illustrates a schematic arrangement relationship of configuration elements of the display device, and does not indicate actual dimensions, the number of prisms, and the like.

The image display device 11 is an example of an image display unit, and may be, for example, a liquid crystal display or an organic EL display. The image display device 11 displays a two-dimensional image in a display region on the display surface of the display device 1, the two-dimensional image projected in midair by the display device 1 according to an image signal transmitted from a control device (not illustrated). The image display device 11 is arranged such that the display region faces the incident surface 14a of the light guide plate 14 and is approximately parallel to the incident surface 14a. Note that this arrangement is an example only, and the image display device 11 may be arranged to be inclined with respect to the incident surface 14a. In this case, the positional relationship with the imaging lens 12 changes for each location on the display region of the image display device 11. As a point on the display region is closer to the imaging lens 12, a light beam emitted from the point forms a point at a location farther from the light guide plate 14.

Note that in a case where the collimating lens 13 is arranged such that the center of the incident surface 14a and the optical axis of the collimating lens 13 match in z direction, light beams which are emitted from two points and entered inside the light guide plate 14 via the incident surface 14a form identical angles with the diffusion surface 14b, the two points located at positions separated by an identical distance from the optical axis in z direction on a plane orthogonal to the optical axis. Therefore, the light beams from the two points are reflected by an identical prism 141 and are directed to a viewpoint. Therefore, the two points appear to overlap with each other from the viewpoint of an observer.

Therefore, the image display device 11 is preferably arranged such that the entire display region is located on a front side or a back side with respect to the light guide plate 14 in z direction. In the embodiment, the entire display region of the image display device 11 is located on the back side with respect to the light guide plate 14.

In addition, in this case, in order to increase an amount of light entering inside the light guide plate 14 from the image display device 11 via the collimating lens 13, a mirror 20 is preferably arranged. As illustrated by a dotted line in FIG. 2, the mirror 20 is arranged on the side opposite to the image display device 11 in z direction with respect to the optical axis of the collimating lens 13. The mirror 20 has a reflective surface parallel to the outgoing surface 14c and directed to the image display device 11.

The imaging lens 12 is an example of an image forming unit, and is a cylindrical lens which has positive power on xy plane and does not have power on yz plane. The imaging lens 12 is arranged between the image display device 11 and the incident surface 14a of the light guide plate 14 such that the optical axis of the imaging lens 12 is parallel to the normal line of the incident surface 14a. Note that the imaging lens 12 may be a bulk lens, or a Fresnel lens or a diffraction lens in order to reduce the thickness of the imaging lens 12. In addition, the imaging lens 12 may be one lens or may include a plurality of lenses arranged in y direction in order to correct aberration. Furthermore, at least one lens surface of the imaging lens 12 may be aspherical also on xy plane in order to correct aberration.

The imaging lens 12 converges light beams on xy plane, the light beams emitted from respective points (pixels) on the display region of the image display device 11. As described later, the imaging lens 12 forms an image of the light beams at a predetermined location between the outgoing surface 14c of the light guide plate 14 and the observer. Therefore, the image display device 11 is arranged at a location separated from the imaging lens 12 by more than the focal distance (for example, focal distance f=90 mm) of the imaging lens 12.

The collimating lens 13 is arranged between the image display device 11 and the incident surface 14a of the light guide plate 14. Note that in the embodiment, the collimating lens 13 is arranged between the imaging lens 12 and the incident surface 14a; however, the collimating lens 13 may be arranged between the image display device 11 and the imaging lens 12. In addition, in the embodiment, the collimating lens 13 is arranged such that the optical axis of the collimating lens 13 is parallel to the normal line of the incident surface 14a. The collimating lens 13 is configured as a cylindrical lens which has positive power on yz plane, and does not have power on xy plane. Note that the collimating lens 13 may be a bulk lens, or a Fresnel lens, similarly to the imaging lens 12. In addition, the collimating lens 13 may be one lens or may include a plurality of lenses arranged in y direction. Furthermore, at least one lens surface of the collimating lens 13 may be aspherical also on yz plane.

In addition, the imaging lens 12 and the collimating lens 13 may be configured as one lens. In this case, for example, the lens is formed such that one surface of the lens has positive power only on xy plane, and the other surface of the lens has positive power only on yz plane. Alternatively, the collimating lens 13 may be formed integrally with the incident surface 14a. That is, the incident surface 14a may be formed as a cylindrical lens.

The collimating lens 13 is an example of a collimating member, and collimates light beams on yz plane, the light beams emitted from respective points (pixels) on the display region of the image display device 11. Furthermore, the collimating lens 13 configures an image projection unit together with the image display device 11. Therefore, the image display device 11 is arranged on a focal plane (for example, location corresponding to focal distance f=291 mm) of the collimating lens 13. That is, light beams emitted from the respective points (pixels) on the display region of the image display device 11 are converged on xy plane and are collimated on yz plane by the imaging lens 12 and the collimating lens 13, and enter the light guide plate 14. Therefore, the light beams emitted from the respective points (pixels) on the display region of the image display device 11 enters the light guide plate 14 as parallel light beams having different angles on yz plane according to the location of each point in z direction, and propagate inside the light guide plate 14.

The light guide plate 14 directs light beams emitted from the image display device 11, toward the observer. Therefore, the light guide plate 14 is a transparent member formed into a flat-plate shape, and a side wall of the light guide plate 14 on a side facing the image display device 11 is formed as the incident surface 14a. A light beam enters inside the light guide plate 14 through the incident surface 14a, and propagates along y direction while the light beam is totally reflected between the diffusion surface 14b and the outgoing surface 14c. The diffusion surface 14b is a surface on the back side of the light guide plate 14. The outgoing surface 14c is a surface on the front side of the light guide plate 14, that is, the surface opposite to the diffusion surface 14b.

In addition, a plurality of prisms 141 is formed on the diffusion surface 14b of the light guide plate 14. The plurality of prisms 141 reflects light beams entering inside the light guide plate 14 via the incident surface 14a such that the light beams are emitted toward the observer via the outgoing surface 14c. Each prism 141 is an example of a deflecting unit. As will be described in detail later, light beams emitted from the image display device 11 and propagating inside the light guide plate 14 are directed to a specific viewpoint by the prisms 141 and slits 151 formed in the mask 15.

Figure 3:
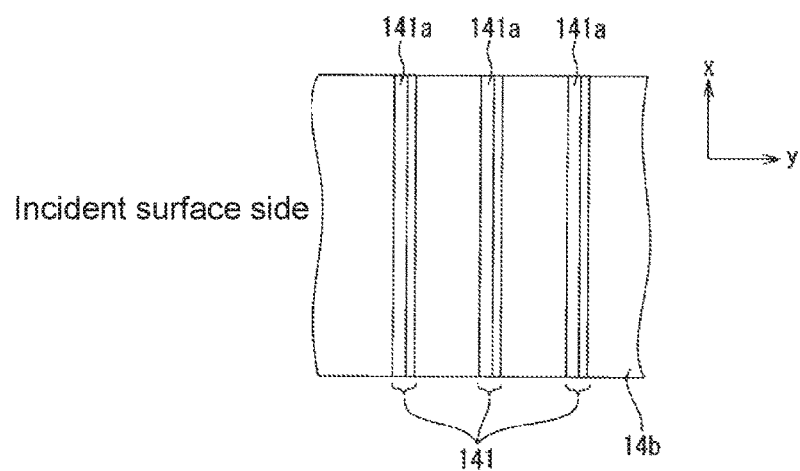
FIG. 3 is a partial enlarged view of a diffusion surface viewed from a front side.

FIG. 3 is a partial enlarged view of the diffusion surface 14b viewed from the front side. The plurality of prisms 141 is arranged in a lattice shape at predetermined pitches (for example, 1 mm) in y direction. For example, each of the plurality of prisms 141 is formed as a groove having an approximately triangular cross-section, the groove extending along a direction approximately parallel to x direction, that is, the longer direction of the incident surface 14a, and having a predetermined width (for example, 10 µm) in y direction. Each of the plurality of prisms 141 has a reflective surface 141a forming a predetermined angle α between the reflective surface 141a and the diffusion surface 14b, and directed to face the incident surface 14a. Note that predetermined angle α is set to an angle which allows light entering the light guide plate 14 from the image display device 11 to be totally reflected and directed to the outgoing surface 14c. For example, the angle falls within the range from 37 to 45° with respect to the diffusion surface 14b. Note that in the embodiment, each prism 141 is formed such that angle α is identical among the prisms 141.

Since each prism 141 is formed as described above, light beams emitted from the image display device 11 and entering inside the light guide plate 14 are converged on xy plane by the imaging lens 12. When the light beams are reflected by the prisms 141, the light beams are then converged on xz plane. In addition, the light beams are collimated on yz plane by the collimating lens 13. Therefore, each of the light beams forms an angle with the reflective surface 141a of the prism 141 on yz plane, the angle corresponding to the location in z direction on the display region of the image display device 11, from which the light beam is emitted. As a result, light beams emitted from the respective points on the display region of the image display device 11 are emitted in different directions on yz plane, according to the location of each point in z direction.

Note that each of the imaging lens 12, the collimating lens 13, and the light guide plate 14 is formed by molding, for example, a material transparent to visible light, for example, a resin such as polymethyl methacrylate (PMMA), polycarbonate, or cycloolefin polymer.

The mask 15 is a sheet-like member formed of a material opaque to visible light, and is arranged on a front side with respect to the outgoing surface 14c of the light guide plate 14. The plurality of slits 151 parallel to x direction is arranged in y direction in the mask 15. The slits 151 correspond to the prisms 141, respectively.

As illustrated in FIGS. 1 and 2, in the embodiment, each slit 151 is provided at a location where only light beams directed toward a specific viewpoint 100 are allowed to pass through and the other light beams are shut off, from among light beams emitted from the image display device 11, propagating inside the light guide plate 14, and reflected by the corresponding prism 141. Therefore, in this example, light beams emitted from the image display device 11 are collimated on yz plane by the collimating lens 13. Therefore, light beams pass through different slits 151 according to the location in z direction on the display region of the image display device 11, from which the light beam is emitted. For example, in the example illustrated in FIG. 2, as a light beam is emitted from a point located closer to the back side on the display region of the image display device 11, the light beam passes through the slit 151 closer to the incident surface 14a and is directed to the viewpoint 100. However, the embodiment is not limited to this as long as the location in z direction on the display region of the image display device 11 corresponds one-to-one to a set of the prism 141 and the slit 151.

In addition, as illustrated in FIGS. 1 and 2, the viewpoint 100 is located within a linear range along x axis, and is set to be farther than image formation points 101 at which the imaging lens 12 forms an image of light beams emitted from the respective points in the display region of the image display device 11. Therefore, when seen from the viewpoint 100, a real image of an image displayed on the display region is projected on a plane 102 formed by a set of the image formation points 101 corresponding to the points on the display region of the image display device 11, respectively. The observer who observes an image from the viewpoint 100 can observe the real image projected on the plane 102.

In addition, since light beams spread from the respective image formation points 101 on xz plane, parallax due to eye positions is reproduced in x direction with respect to an image projected in midair. Therefore, an observer can stereoscopically observe the image projected in midair by making both eyes positioned along x direction at the viewpoint 100. In addition, the observer can observe the real image projected on the plane 102 even when the observer moves the viewpoint along x direction from the viewpoint 100. As described, the display device 1 can widen the range where an image projected in midair can be visually recognized.

As described above, this display device converges light beams emitted from the respective points in the display region of the image display device, on a plane parallel to the longer direction of the incident surface, and forms an image at a predetermined location after the light beams are emitted from the light guide plate. In contrast, the display device collimates the light beams on a plane orthogonal to the longer direction of the incident surface. The display device changes the angle of the light beam emitted from the light guide plate according to the location of the point where the light beam is emitted, in the direction orthogonal to the longer direction of the incident surface. In addition, the slit provided on the mask makes the location on the light guide plate, where the light beam is emitted, correspond one-to-one to a light emission direction, and allows only light beams directed toward a specific viewpoint located on the front side of the light guide plate to pass through. Thus, the display device enables the observer to visually recognize an image displayed on the image display device and projected in midair when the observer sees the image from the viewpoint. Furthermore, in the display device, light emitted from the respective points in the display region of the image display device appear to spread from an image formation location on a plane in the direction in which the light beams are converged. Therefore, by positioning both eyes in the direction, the observer can stereoscopically observe the projected image and visually recognize the projected image even when the observer changes the viewpoint along the direction.

Figure 4:
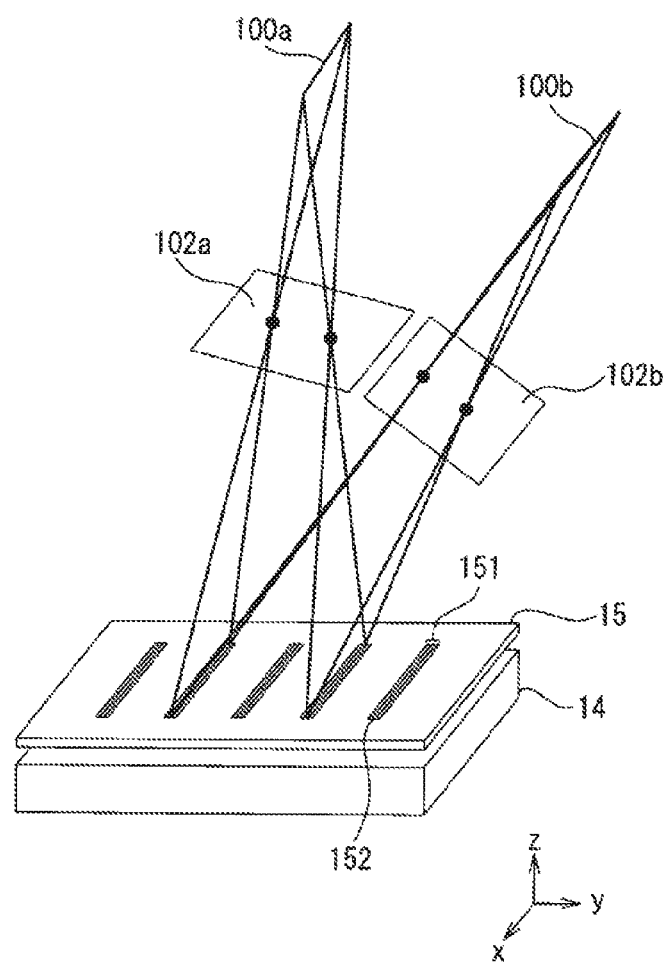
FIG. 4 is a schematic perspective view of a light guide plate and a mask according to a modification.

FIG. 4 is a schematic perspective view of the light guide plate and the mask according to a modification. According to this modification, a diffusion member 152 is provided for each slit 151 of the mask 15. The diffusion member 152 diffuses light passing though the slit 151 on yz plane, that is, a plane including the light propagation direction inside the light guide plate 14 and the normal line of the outgoing surface 14c. For example, the diffusion members 152 may be diffraction gratings formed at predetermined pitches in y direction, or cylindrical concave lenses each having negative power in y direction. Thus, the mask 15 can give parallax in x direction and widen the range in y direction in which the observer can see an image projected in midair. For example, when both the eyes of the observer are positioned along a viewpoint 100a parallel to x direction, the observer can stereoscopically observe an image projected on a plane 102a. In contrast, when both the eyes of the observer are positioned along a viewpoint 100b shifted in y direction from the viewpoint 100a and parallel to x direction, the observer can stereoscopically observe the image projected on a plane 102b. As described, in this modification, when the observer shifts the eye positions along y direction, the location where the projected image appears changes according to shift of the viewpoint. However, also in this modification, when the observer shifts the eye positions along x direction, the location where the projected image appears does not change.

Figure 5:
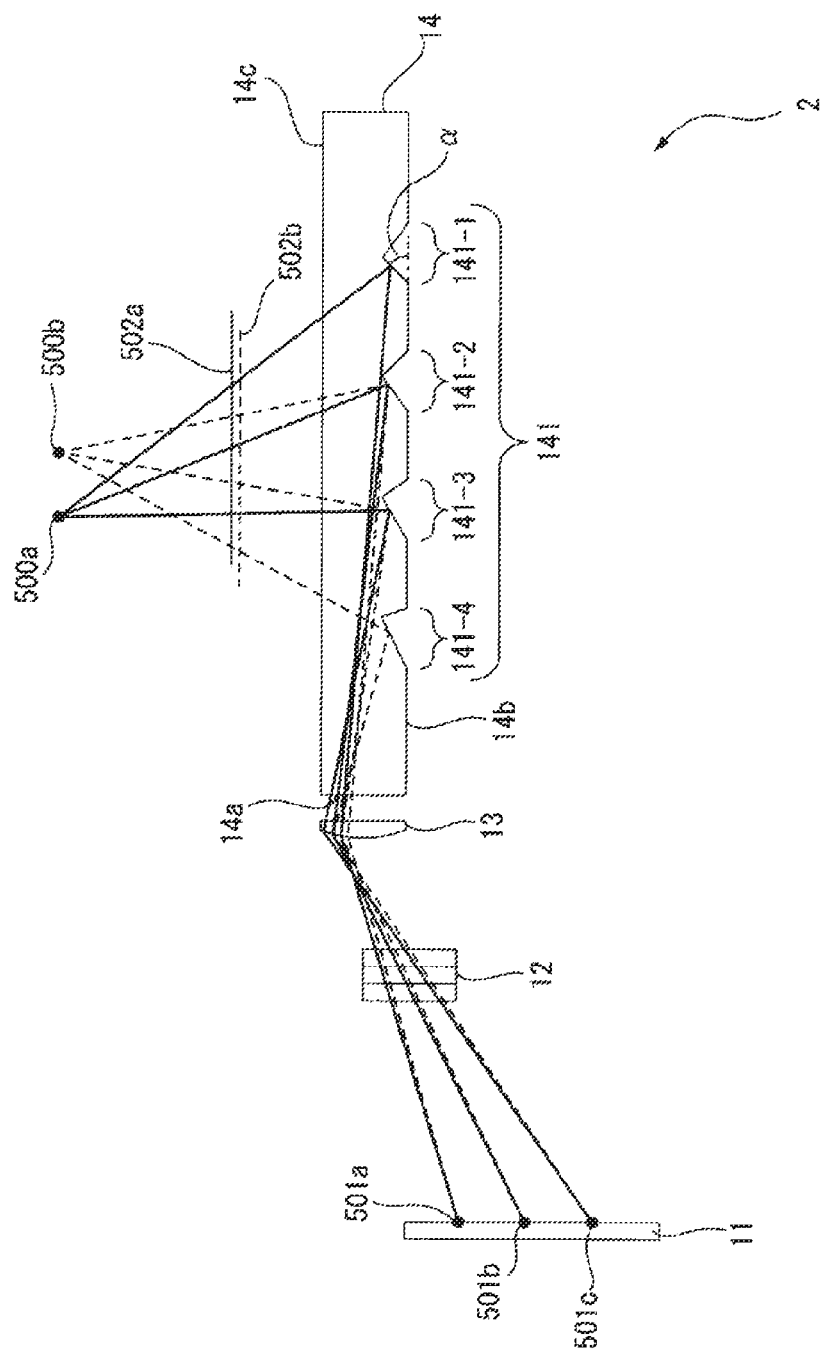
FIG. 5 is a schematic side view of a display device according to a second embodiment.

Next, a display device according to a second embodiment will be described. FIG. 5 is a schematic side view of a display device 2 according to the second embodiment. The display device 2 according to the second embodiment includes an image display device 11, an imaging lens 12, a collimating lens 13, and a light guide plate 14.

The display device 2 according to the second embodiment differs from the display device 1 according to the first embodiment in that the mask 15 is omitted and the configuration of a prism provided on a light guide plate 14 differs from that of the display device 1. Hereinafter, the above point of difference will be described. Regarding other configuration elements of the display device 2, refer to description of corresponding configuration elements of the display device 1 according to the first embodiment.

In the display device 2 according to the second embodiment, angle α between a reflective surface of each prism 141 and a diffusion surface 14b is set such that as the prism 141 is farther from an incident surface 14a, angle α is greater. Note that angle α is preferably set such that even the prism 141 farthest from the incident surface 14a can totally reflect light from the image display device 11.

Angle α of the reflective surface of each prism 141 is set as described above. Therefore, in the second embodiment, a light beam emitted from a location on a display region of the image display device 11, the location closer to a back side in z direction, and directed to a predetermined viewpoint (for example, a viewpoint 500a or a viewpoint 500b) is reflected by the prism 141 farther from the incident surface 14a. However, the embodiment is not limited to this as long as locations in z direction on the display region of the image display device 11 correspond one-to-one to the prisms 141. In addition, in this embodiment, a light beam reflected by the prism 141 farther from the incident surface 14a is directed further toward the incident surface 14a. In contrast, a light beam reflected by the prism 141 closer to the incident surface 14a is directed further away from the incident surface 14a. Therefore, even though the mask 15 is omitted, the display device 2 can emit a light beam from the image display device 11 toward a specific viewpoint. In addition, also in this embodiment, with respect to x direction, light emitted from the light guide plate 14 forms an image on a plane where the image is projected, and diffuses as the light separates from the plane. Therefore, since the display device 2 can give parallax in x direction, an observer can stereoscopically observe the projected image by positioning both eyes in x direction.

In this embodiment, light reflected by each prism 141 and directed to the viewpoint is not shielded. Therefore, the observer can observe an image displayed on the image display device 11 and projected in midair even when the observer moves the viewpoint along y direction. However, the angle formed by a light ray directed to the viewpoint from each prism 141 and the reflective surface of each prism 141 changes according to the location of the viewpoint in y direction. Therefore, the location of the point on the image display device 11, the point corresponding to the light ray, changes accordingly. For example, in a case where the observer sees an image from the viewpoint 500a, light beams from points 501a to 501c on the image display device 11 are reflected by prisms 141-1 to 141-3, respectively, from among prisms 141-1 to 141-4, and form an image on a projection surface 502a. (The points are denoted by 501a, 501b, and 501c in ascending order of distance from the observer.) (The prisms are denoted by 141-1, 141-2, 141-3, and 141-4 in descending order of distance from the incident surface 14a.) In contrast, it is assumed that the observer moves the eyes to the viewpoint 500b farther from the incident surface 14a than the viewpoint 500a is. In this case, from the viewpoint 500b, light is observed which is emitted from the light guide plate 14 in a direction further away from the incident surface 14a with respect to the viewpoint 500a. In the embodiment, angle α between the reflective surface of each prism 141 and the diffusion surface 14b is set such that as the distance from the incident surface 14a is greater, angle α is greater. Therefore, for example, light beams from the points 501a to 501c on the image display device 11 are reflected by the prisms 141-2 to 141-4 closer to the incident surface 14a, form an image on a projection surface 502b, and are directed to the viewpoint 500b. Therefore, even when the observer changes the viewpoint along y direction, the location of the projection image does not shift very much. In addition, also in this example, light beams from the respective points on the image display device 11 form an image to some extent also in y direction by the prisms 141. Therefore, the observer can observe a stereoscopic image even when both the eyes are positioned in y direction.

Furthermore, according to this embodiment, since a mask is not used, the amount of light that is lost is less, and the display device can project a brighter image in midair. In addition, according to this embodiment, since a mask is not used, the display device 2 enables the observer to visually recognize both an object (not illustrated) behind the light guide plate 14 and a projected image.

The area ratio of the region where the prisms 141 are formed to the diffusion surface 14b is referred to as arrangement density. Note that the arrangement density is preferably less than or equal to the upper limit of the arrangement density which makes the observer feel that the observer visually recognizes the object (not illustrated) behind the light guide plate 14 through a transparent member or a vacant space. Therefore, for example, the prisms 141 are preferably arranged such that the arrangement density is less than or equal to 30.0%.

Alternatively, with respect to the light guide plate 14, a haze value, which represents the ratio of diffused light to the entire transmitted light is preferably less than or equal to the upper limit of the haze value which makes the observer feel that the observer visually recognizes the object (not illustrated) behind the light guide plate 14 through a transparent member or a vacant space. For example, the prisms 141 are preferably arranged such that the haze value is less than or equal to 28%.

In addition, in the above each embodiment and modification, the prisms 141 arranged on the diffusion surface 14*b* of the light guide plate 14 may be dispersedly formed also in the longer direction of the incident surface 14*a* (that is, x direction). In this case, the prisms 141 may be arranged in a square lattice or may be arranged zigzag.

Note that also in this embodiment, a cylindrical lens having power on yz plane may be arranged for each prism 141, at a location where light reflected by the prism 141 and emitted from the outgoing surface 14*c* passes, the location facing the outgoing surface 14*c*.

Figure 6:
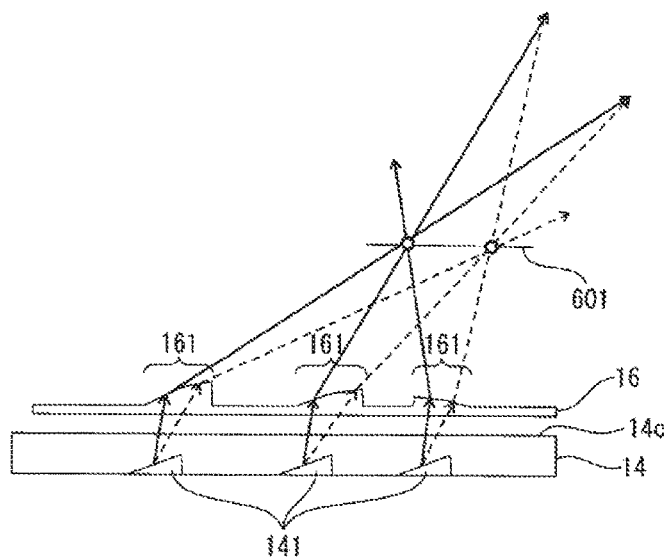
FIG. 6 is a schematic side view of a light guide plate and a cylindrical lens according to a modification.

FIG. 6 is a schematic side view of the light guide plate and a cylindrical lens according to this modification. In this modification, a prism sheet 16 formed of a transparent member is arranged to face the outgoing surface 14*c* of the light guide plate 14. A prism 161 is provided for each prism 141 on the prism sheet 16. The prism 161 is provided at a location where light emitted from the image display device 11, reflected by the prism 141, and emitted from the outgoing surface 14*c* passes through. In this example, in the light guide plate 14, a light beam from each point on the image display device 11 propagates in a direction according to the location of the point in z direction. Therefore, light beams from the respective points on the image display device 11 are reflected by the prisms 141 such that the light beams are emitted from the outgoing surface 14*c* in different directions on yz plane according to the location of the point in z direction. Therefore, the light beams from the respective points on the image display device 11 pass through different locations in y direction in the prisms 161 according to the location of the point in z direction. Therefore, the direction of a refracting surface of each prism 161 on yz plane is appropriately set according to the location in y direction in the prism 161, where the light beam passes. Thus, a light beam from an arbitrary point on the image display device 11 passes through an identical location on a projection surface 601 no matter which prism 141 reflects the light beam. Therefore, this display device enables the location of a projected image to be fixed even when the observer changes the location of the viewpoint along y direction. That is, in this modification, the display device can correct the location where light from the image display device 11 is projected for each prism 141.

Note that in this modification, the direction of light emitted from the light guide plate 14 on yz plane can be adjusted by each prism 161 provided on the prism sheet 16. Therefore, the angles each formed by the reflective surface of each prism 141 formed on the light guide plate 14 and the diffusion surface may be identical to one another.

Note that in above each embodiment, an object for display may be placed in lieu of the image display device 11. In this case, the location where a point on the object is projected changes according to the positional relationship between the point on the object and the imaging lens 12. Therefore, the image display device can project a stereoscopic image of the object in midair.

Figure 7:
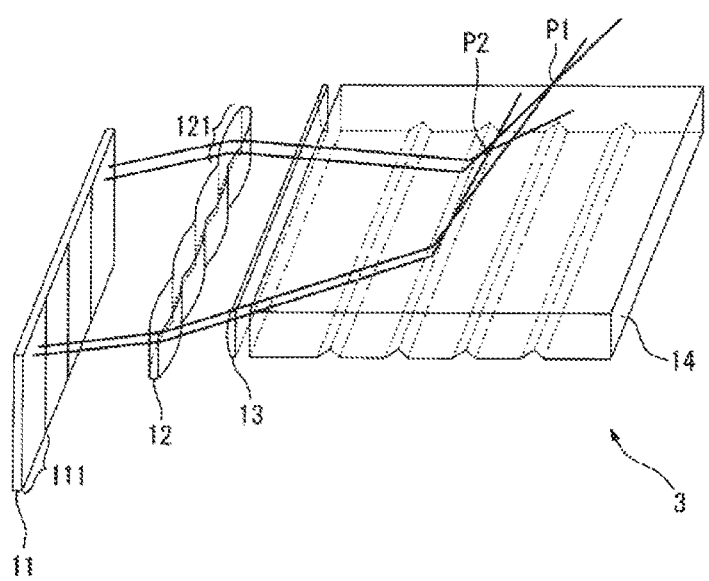
FIG. 7 is a schematic configuration diagram of a display device according to a modification.

According to a modification of the above each embodiment, the imaging lens 12 may be configured as a lens array. FIG. 7 is a schematic configuration diagram of a display device according to this modification. The display device 3 illustrated in FIG. 7 differs from the display device 2 according to the second embodiment in that the imaging lens 12 is configured as a lens array including a plurality of cylindrical lenses 121 arrange in line along x direction. Hereinafter, the above point of difference will be described. Hereinafter, each cylindrical lens 121 configuring the lens array is referred to as a sub-cylindrical lens. As described, by configuring the imaging lens 12 as a lens array, the imaging lens 12 can be made small. In addition, since only light passing through a portion close to an optical axis is used, aberration is lower than that in a case of using one cylindrical lens.

In addition, in this modification, the display region of the image display device 11 is divided in x direction into a plurality of partial regions 111 corresponding to sub-cylindrical lenses 121, respectively. Each partial region 111 displays an image of an identical subject viewed in an identical direction.

In this modification, by adjusting the locations of images displayed on the partial regions 111, light beams from identical points on the images displayed on the partial regions 111 form a point at a location in midair. For example, an image may be displayed in each partial region 111 such that an identical point on each image is located at an intersection between a light ray and each partial region 111, the light ray passing through point P1 in midair and a principle point of each sub-cylindrical lens 121. That is, as an image is projected closer to the light guide plate 14, the location of the image displayed in each partial region 111 is farther in x direction from the center in x direction of the light guide plate 14. Therefore, the display device according to this modification can change the location where light beams from identical points on images displayed in the partial regions 111 converge, that is, the location where the image displayed in each partial region is projected, by adjusting the locations of the images displayed in the partial regions 111.

In addition, this display device can stereoscopically display an image by changing, for each point in the image, the location in midair where light beams from corresponding points in the partial regions 111 converge. For example, a first point on an image may be displayed at an intersection between a light ray and each partial region 111, the light ray passing through point P1 in midair and the principle point of each sub-cylindrical lens 121. A second point on the image may be displayed at an intersection between a light ray and each partial region 111, the light ray passing through point P2 in midair and the principle point of each sub-cylindrical lens 121. That is, the partial regions 111 display images of an identical subject viewed in different directions. Thus, it appears to an observer that the first point is located at point P1 and the second point is located at point P2.

However, as the relationship between each partial region 111 and the location where an image displayed on each partial region 111 is projected is deviated more from the positional relationship which is an imaging relationship achieved by the sub-cylindrical lens 121, a projected image in blurred more. Therefore, the location where the image is projected is preferably adjusted to the extent that image blur is permissible.

In addition, a different image may be displayed for each partial region 111. In this case, power of each sub-cylindrical lens 121 may differ for each image display device. By using a sub-cylindrical lens having different power for each image display device, the location where an image displayed in the partial region 111 is formed changes for each partial region 111. Therefore, since the display device can project an image at a different location for each partial region 111, a stereoscopic image can be displayed. In addition, in a case where each sub-cylindrical lens is independently formed, the location of the sub-cylindrical lens in y direction may be changed for each partial region 111. Alternatively, a different image display device may be used for each partial region 111. In this case, the location of each sub-cylindrical lens may be identical in y direction, and the location of the image display device in the direction may be changed for each image display device. Also in this case, the location where an image displayed on the image display device is formed changes for each image display device according to the positional relationship between the image display device and the sub-cylindrical lens. Therefore, the display device can project an image at a different location for each image display device.

In addition, in the case where a separate image display device is used for each partial region 111, a set of an image display device and a corresponding sub-cylindrical lens may be replaced by a projector.

Figure 8:
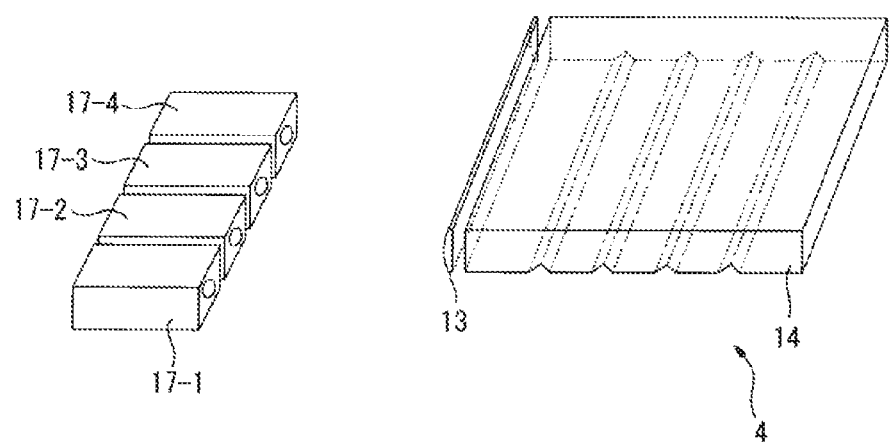
FIG. 8 is a schematic configuration diagram of a display device according to another modification.

FIG. 8 is a schematic configuration diagram of a display device according to this modification. The display device 4 according to this modification differs from the display device 3 illustrated in FIG. 7 in that the display device 4 includes a plurality of projectors 17-1 to 17-n (n is an integer greater than or equal to 2. In FIG. 8, n=4) in lieu of the image display device 11 and the imaging lens 12. Hereinafter, the above point of difference will be described.

Each of the plurality of projectors 17-1 to 17-n includes a display (not illustrated) which displays an image for projection, and a projection optical system (not illustrated) for projecting the image displayed on the display. Therefore, each of the plurality of projectors 17-1 to 17-n is another example of the image display unit and image forming unit.

Similarly to the display device 3, also in the display device 4, an identical image is displayed on each of the projectors 17-1 to 17-n. Thus, the display device 4 can obtain effects similar to those of the display device 3.

Note that the projection optical system of the projector is generally formed to be rotationally symmetrical with respect to an optical axis of the projection optical system. Therefore, the projection optical system has positive power not only on xy plane but also on yz plane, that is, a plane including the normal line of the outgoing surface 14c of the light guide plate 14 and the normal line of the incident surface 14a. Therefore, in this modification, a collimating lens 13 is preferably formed as a cylindrical lens having power such that light beams from respective points on the displays of the projectors 17-1 to 17-n are collimated on yz plane in the entire optical system including the projection optical systems of the projectors 17-1 to 17-n and the collimating lens 13. Such power is determined according to the positional relationship between the projection optical system and the collimating lens 13 and power of the projection optical system.

According to yet another modification, a microlens array may be arranged on a front side with respect to the outgoing surface 14c of the light guide plate 14. Thus, the location where an image is projected may be changed according to the location in y direction in the display region of the image display device.

Figure 9:
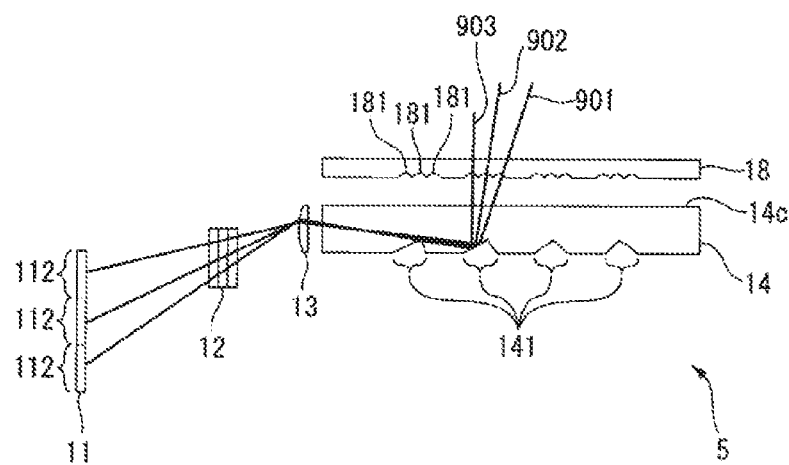
FIG. 9 is a schematic side view of a display device according to yet another modification.

FIG. 9 is a schematic side view of a display device according to this modification. The display device 5 differs from the display device 2 in that the display device 5 includes a microlens array 18 arranged on the front side with respect to the outgoing surface 14c of the light guide plate 14. Hereinafter, this point of difference will be described.

As described above, the angle of a light beam propagating in the light guide plate 14, the light beam emitted from a point on the display region of the image display device 11, changes according to the location of the point in z direction. Therefore, the direction of the light beam emitted from the outgoing surface 14c on yz plane changes according to the location of the point in z direction on the display region of the image display device 11. As a result, as indicated by lines 901 to 903, on a side closer to the observer with respect to the outgoing surface 14c, locations in y direction of light beams reflected by an identical prism 141 differ from each other according to the locations in y direction of the respective points from which the light beams are emitted, the points located on the display region of the image display device 11.

Therefore, in the microlens array 18, a plurality of microlenses 181 is provided in y direction for each prism 141 of the light guide plate 14 in a range where light beams reflected by the prism 141 and emitted from the outgoing surface 14c pass through. Each microlens 181 corresponds to a partial region 112 obtained by dividing the display region of the image display device 11 into a plurality of regions in z direction. In particular, the microlens 181 closer to the incident surface 14a corresponds to the partial region 112 located closer to the back side.

For example, each microlens 181 is formed as a cylindrical lens having a refracting surface of a cylindrical side-surface shape extending along x direction such that the cylindrical lens has power on yz plane and does not have power on xy plane. For example, in the example illustrated in FIG. 9, the display region of the image display device 11 is divided into the three partial regions 112 in z direction. Therefore, the microlens array 18 includes the three microlenses 181 for each prism 141. The three microlenses 181 are arranged in y direction.

Thus, light beams emitted from points in different partial regions 112 pass through different microlenses 181. Therefore, an optical system which forms an image displayed on one of the partial regions 112 can differ from optical systems which forms images displayed on the others of the partial regions 112. Therefore, the display device 5 can project images displayed on the partial regions 112, at different locations. Therefore, the display device 5 can display a stereoscopic image.

Note that each microlens 181 may have a different prism component according to the corresponding partial region 112. That is, the optical axis of each microlens 181 may be inclined according to the relationship between the direction of a light beam when the light beam emitted from the corresponding partial region 112 is emitted from the light guide plate 14 and a projection location. The direction in which a light beam emitted from a point in the partial region 112 is refracted by each microlens 181 differs for each partial region 112 depending on the prism component of the microlens 181. Therefore, the display device 5 can adjust the direction of a projected image, in particular, inclination of the projected image with respect to y direction on yz plane, for each partial region 112. Furthermore, a prism may be used in lieu of each microlens. That is, a microprism array may be used in lieu of the microlens array. In this case, directions of refracting surfaces of prisms corresponding to the partial regions 112 are adjusted such that the directions differ from one another according to the location of the projected image corresponding to the partial region 112. Also in this case, the display device 5 can adjust the direction of the projected image for each partial region 112.

According to yet another modification, in lieu of including the imaging lens 12, each prism provided in the light guide plate 14 may be formed such that each prism has power on xy plane.

Figure 10:
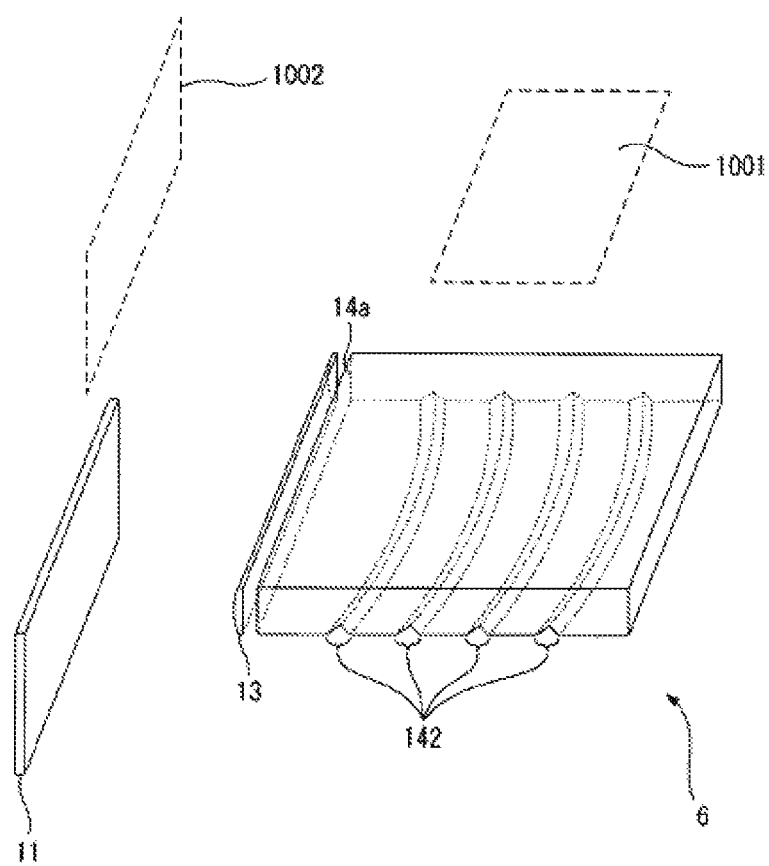
FIG. 10 is a schematic configuration diagram of a display device according to yet another modification.

FIG. 10 is a schematic configuration diagram of a display device according to this modification. The display device 6 illustrated in FIG. 10 differs from the display device 2 in that the imaging lens 12 is omitted and each prism 142 provided on the diffusion surface 14b of the light guide plate 14 is formed as a concave mirror on xy plane. Therefore, the above point of difference will be hereinafter described.

Each prism 142 is formed in an arc shape such that the prism is concave with respect to the incident surface 14a on xy plane. Therefore, each prism 142 is a concave mirror having positive power on xy plane. Thus, even though the imaging lens 12 is omitted, light beams emitted from the respective points on the display region of the image display device 11 and entering inside the light guide plate 14 are reflected by the prisms 142 and form an image on the side of the observer with respect to the outgoing surface 14c. Therefore, similarly to the display device 2, the display device 6 can project in midair an image displayed on the display region of the image display device 11.

Power of each prism 142 is set according to the location where an image displayed on the image display device 11 is projected. For example, as indicated by a projection image 1001, in a case of projecting an image displayed on the image display device 11 arranged along xz plane such that the image is approximately parallel to the outgoing surface 14c of the light guide plate 14, the prisms 142 are formed in the following manner. The prism 142 farther from the incident surface 14a has a smaller curvature radius. In addition, each prism 142 may be formed such that the center of each prism 142 is located, for example, on a center line of the light guide plate 14 in x direction.

Alternatively, when the prism 142 farther from the incident surface 14a has a greater curvature radius, power of the prism 142 is smaller as the prism 142 is located farther from the incident surface 14a. As a result, the distance which establishes an imaging relationship becomes longer. Therefore, as indicated by a projection image 1002, the display device 6 can project an image toward a side closer to the incident surface 14a with respect to a side right in front of the light guide plate 14 such that the image forms a predetermined angle with respect to the outgoing surface 14c.

Note that also in this embodiment, the angle between the reflective surface of each prism 142 and the diffusion surface 14b of the light guide plate 14 is set to be greater as the prism 142 is farther from the incident surface 14a. Therefore, the observer can observe an image displayed on the image display device 11 and projected in midair by the light guide plate 14 from a predetermined viewpoint.

According to this modification, since the imaging lens 12 is omitted, the display device can be made small.

In addition, according to a modification of the display device 6, each prism 142 may be formed as a retroreflective element in lieu of being formed as a concave mirror.

Figure 11:
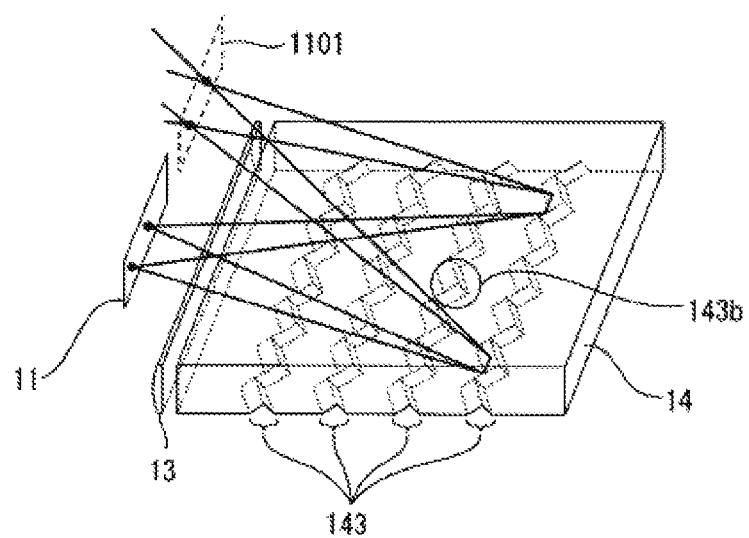
FIG. 11 is a schematic configuration diagram of a display device according to yet another modification.

FIG. 11 is a schematic configuration diagram of a display device according to this modification. The display device 7 illustrated in FIG. 11 differs from the display device 6 in the shape of each prism 143 provided on the diffusion surface 14b of the light guide plate 14. Hereinafter, the above point of difference will be described.

In this embodiment, each prism 143 has a shape in which a plurality of corner mirrors 143b is arranged along x direction. The corner mirror 143b retroreflects light on xy plane. Therefore, with respect to light beams emitted from the respective points on the light display region of the image display device 11 and entering inside the light guide plate 14, light components parallel to xy plane, are retroreflected by the corner mirrors 143b of one of the prisms 143 such that the components return to the original directions. Therefore, in this embodiment, as illustrated as a projection image 1101, an image displayed on the image display device 11 is projected at a location approximately identical to the location of the image display device 11 in y direction.

In contrast, also in this embodiment, the angle between a reflective surface of each prism 143 and the diffusion surface 14b of the light guide plate 14 is set to be greater as the prism 143 is farther from the incident surface 14a. Therefore, the observer can observe an image displayed on the image display device 11 and projected in midair by the light guide plate 14, from a viewpoint on a side closer to the image display device 11 with respect to the incident surface 14a.

Figure 12:
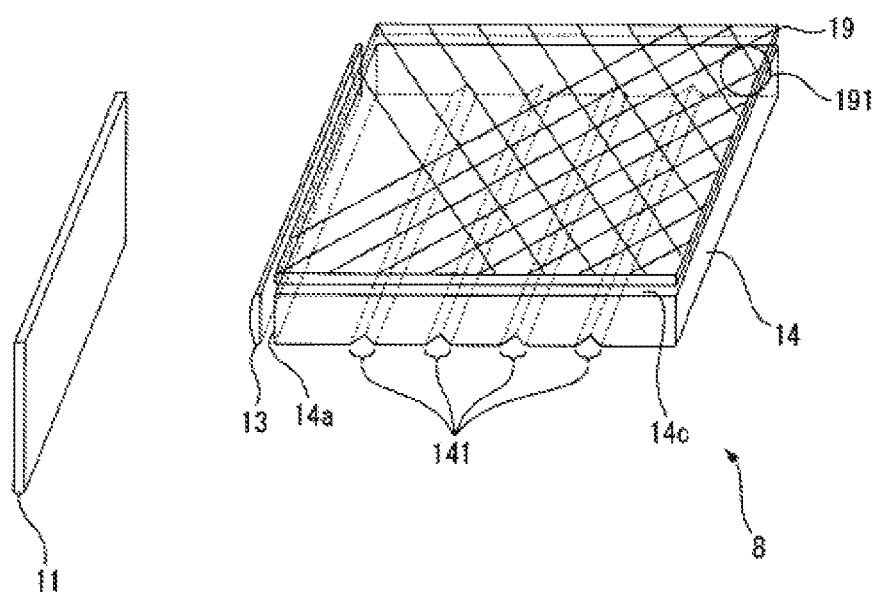
FIG. 12 is a schematic configuration diagram of a display device according to yet another modification.

Note that each prism formed on the light guide plate 14 and the retroreflective element having a retroreflection function may be separately formed. FIG. 12 is a schematic configuration diagram of a display device according to this modification. The display device 8 illustrated in FIG. 12 differs from the display device 2 in that the display device 8 does not include the imaging lens 12 but includes a corner reflector plate 19 arranged on a front side with respect to the outgoing surface 14c of the light guide plate 14. Hereinafter, the above point of difference will be described.

The corner reflector plate 19 is an example of a retroreflection unit, and includes a plurality of corner reflectors 191 arranged in an array. Each corner reflector 191 retroreflects incident light with respect to xy plane. Therefore, in the display device 8, light emitted from the image display device 11 and entering inside the light guide plate 14 is reflected by a prism 141 and is emitted from the outgoing surface 14c. Then, the light is retroreflected by one of the corner reflectors 191 toward the incident surface 14a. Therefore, also in the display device 8, similarly to the display device 7, an image displayed on the image display device 11 is projected at a location approximately identical to the location of the image display device 11 in y direction. Note that also in the case of using the corner reflector plate 19, an imaging lens converging light beams from the image display device 11 on xy plane may be arranged between the image display device 11 and the light guide plate 14.

According to yet another modification, the light guide plate 14 may cause light propagating inside the light guide plate 14 to be emitted from the outgoing surface 14c by means other than a prism.

Figure 13:
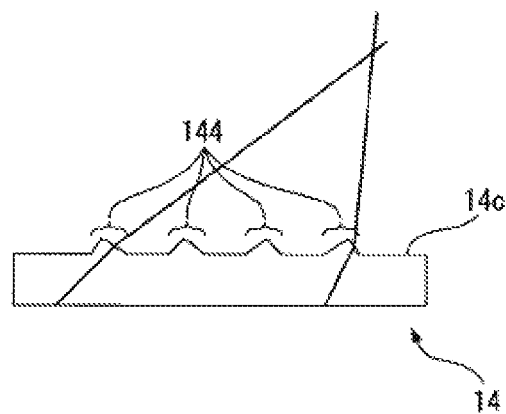
FIG. 13 is a schematic side cross-sectional view of a light guide plate along a direction orthogonal to an incident surface according to yet another modification.

FIG. 13 is a schematic side cross-sectional view of the light guide plate 14 along y direction according to this modification. In this modification, the light guide plate 14 includes a plurality of prisms 144 arranged at predetermined pitches in y direction on the outgoing surface 14c, in lieu of the prisms formed on the diffusion surface 14b.

In the modification, each prism 144 is formed as a projection having an approximately triangular cross-section, the projection projecting to the front side with respect to the outgoing surface 14c and extending in x direction. Therefore, when light emitted from the image display device 11 and entering through an incident surface 14a is incident on one of the prisms 144, the light is refracted on a refracting surface located on the side opposite to the incident surface 14a and is emitted to the front side.

Note that also in this example, the angle between the refracting surface of each prism 144 and the outgoing surface 14c of the light guide plate 14 is set to be greater as the prism 144 is farther from the incident surface 14a.

Therefore, the observer can observe an image from a predetermined viewpoint, the image displayed on the image display device 11 and projected in midair by the light guide plate 14.

According to yet another modification, the light guide plate 14 may be formed with a diffraction grating in lieu of each prism. The diffraction gratings are formed at predetermined pitches in y direction on the diffusion surface 14b. The diffraction grating changes the direction of reflected light into a direction in which the light is emitted without being totally reflected by the outgoing surface 14c. In this case, each diffraction grating includes a plurality of grooves, for example, arranged in y direction and extending in x direction. The pitch between the grooves may be set according to the light reflection direction. Therefore, the pitches between the grooves of the diffraction gratings are set such that the diffraction grating closer to the incident surface 14a reflects light in a direction further away from the incident surface 14a. Thus, similarly to the display device 2, the observer can observe an image from a predetermined viewpoint, the image displayed on the image display device 11 and projected in midair.

According to yet another modification, a light guide plate 14 may be formed into a wedge shape such that the thickness in z direction is smaller as it separates from an incident surface 14a in y direction.

Figure 14:
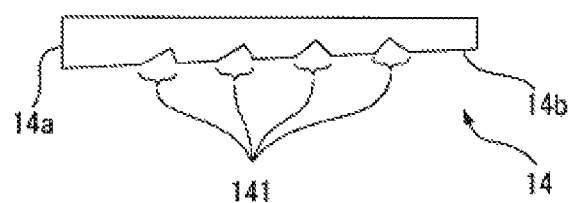
FIG. 14 is a schematic side cross-sectional view of a light guide plate along a direction orthogonal to an incident surface according to yet another modification.

FIG. 14 is a schematic side cross-sectional view of the light guide plate 14 along y direction according to this modification. In this modification, the light guide plate 14 is formed such that the thickness in z direction is smaller as it separates from the incident surface 14a. The light guide plate 14 is arranged such that as it separates from the incident surface 14a, a diffusion surface 14b approaches the front side.

In this modification, as light entering from the incident surface 14a propagates inside the wedge-shaped light guide plate 14, the reflection angle with respect to an outgoing surface 14c gradually becomes greater. Therefore, light reflected by a prism 141 farther from the incident surface 14a is emitted at a greater angle with respect to the outgoing surface 14c. Thus, also in this modification, similarly to the display device 2, the observer can observe an image from the predetermined viewpoint, the image displayed on the image display device 11 and projected in midair. Furthermore, in this modification, the display device can emit light in a direction away from the incident surface 14a depending on the refractive index of the outgoing surface 14c. Therefore, as illustrated as the projection image 1001, the image displayed on the image display device 11 can be projected on a side opposite to the incident surface 14a at a relatively large angle (for example, 60 to 90°) with respect to the outgoing surface 14c.

According to yet another modification, the incident surface of the light guide plate may be formed such that the angle between the incident surface and the outgoing surface of the light guide plate is other than a right angle. For example, as disclosed in Japanese Unexamined Patent Publication No. 2011-186332, the incident surface may be formed into a tapered shape. Alternatively, the incident surface may be formed to be parallel to the outgoing surface or the diffusion surface, and the surface of the light guide plate on a side opposed to the incident surface may be formed such that the angle between the surface and the outgoing surface or the diffusion surface is 45°. Thus, the angle between the image display device and the outgoing surface of the light guide plate can be made small. Therefore, the display device can be made thin.

Furthermore, in another modification of the above each embodiment, a light guide member which guides light from the image display device 11 toward the light guide plate 14 may be used in lieu of the collimating lens 13.

Figure 15:
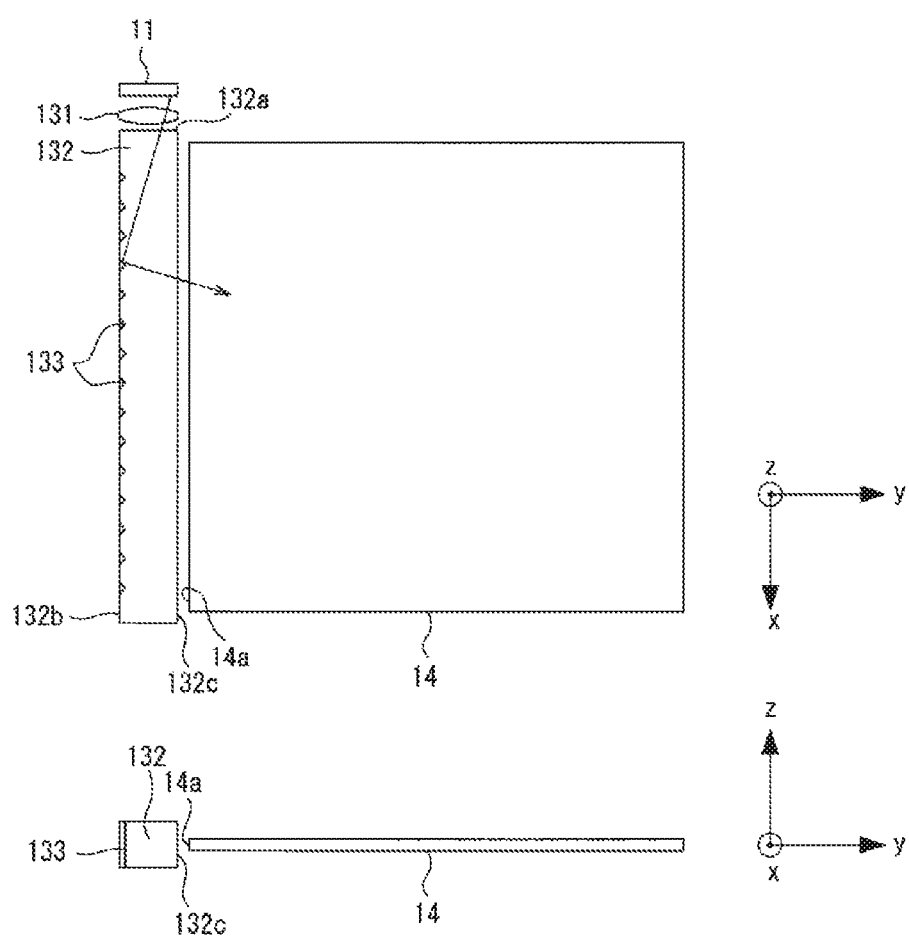
FIG. 15 is a diagram illustrating an example of arrangement of an image display device, a light guide member, and a light guide plate according to yet another modification.

FIG. 15 is a diagram illustrating an example of arrangement of the image display device, the light guide member, and the light guide plate according to this modification.

In this modification, a collimating lens 131 and a light guide member 132 are arranged such that light beams emitted from the image display device 11 reach the incident surface 14a of the light guide plate 14 via the collimating lens 131 and the light guide member 132. The light beams are parallel to each other on yz plane, the light beams each having an angle corresponding to a location from which the light is emitted on the image display device 11. The light beams are parallel to each other also on xy plane. Note that the collimating lens 131 and the light guide member 132 are another example of the collimating member. In addition, the collimating lens 131 and the light guide member 132 configure an image projection unit together with the image display device 11.

Specifically, the light guide member 132 is a transparent member formed into a rectangular parallelepiped shape. One surface along a shorter direction is formed as an incident surface 132a. In addition, one surface along the longer direction of the light guide member 132 is formed as an outgoing surface 132c from which light entering from the incident surface 132a is emitted. The surface opposite to the outgoing surface 132c is formed as a diffusion surface 132b. The light guide member 132 is preferably formed in the following manner. The length in the longer direction of the light guide member 132 is approximately equal to the length of the incident surface 14a in the longer direction, and the thickness of the light guide member 132 on yz plane is thicker than the thickness of the light guide plate 14 on yz plane. Thus, the light guide member 132 can guide a light beam from the image display device 11 to the light guide plate 14 while maintaining the angle of the light beam corresponding to the location in z direction from which the light is emitted, on the display surface of the image display device 11.

In addition, the light guide member 132 is arranged such that the outgoing surface 132c of the light guide member 132 faces the incident surface 14a of the light guide plate 14. In addition, the image display device 11 is arranged such that the image display device 11 faces the incident surface 132a of the light guide member 132 via the collimating lens 131, and is located at a front focal point of the collimating lens 131. That is, in this example, the image display device 11 is arranged such that the display surface of the image display device 11 is parallel to the direction orthogonal to the incident surface 14a of the light guide plate 14. Therefore, in this modification, the image display device can be made small, and an entire display device is made small. Note that also in this modification, the incident surface of the light guide member may be formed such that the angle between the incident surface and the outgoing surface of the light guide member is an angle other than a right angle, for example, an acute angle. In addition, the light guide member 132 and the light guide plate 14 may be integrally formed.

Light beams emitted from the image display device 11 are collimated by the collimating lens 131 irrespective of the directions of light beams, and enter the light guide member 132 via the incident surface 132a of the light guide member 132. That is, the light beams emitted from the image display device 11 become parallel light beams directed in directions according to the display location on the image display device 11. Then, the collimated light beams propagate while being totally reflected in the light guide member 132, and are reflected toward the outgoing surface 132c by a plurality of prisms 133 arranged on the diffusion surface 132b of the light guide member 132.

The prisms 133 are arranged in a lattice shape at predetermined pitches (for example, 1 mm) along x direction, that is, the longer direction of the incident surface 14a of the light guide plate 14. For example, each prism 133 is formed as a groove having an approximately triangular cross-section, the groove extending along z direction, and having a predetermined width (for example, 10 μm) in x direction. Each prism 133 has a reflective surface forming predetermined angle β with respect to the diffusion surface 132b and directed to face the incident surface 132a. Note that predetermined angle β is set to an angle which allows light entering the light guide member 132 from the image display device 11 to be totally reflected and directed to the outgoing surface 132c. For example, the angle falls within the range from 37 to 45° with respect to the diffusion surface 132b. Note that the prisms 133 are formed such that angle β is greater as the prism 133 is farther from the incident surface 132a in order to converge light beams directed in an identical direction on xy plane on one point on a predetermined imaging plane. Therefore, similarly to the above each embodiment, light beams emitted from the light guide member 132 are collimated with respect to the shorter direction of the incident surface 14a (that is, thickness direction) of the light guide plate 14, and are converged with respect to the longer direction of the incident surface 14a. Therefore, similarly to the display device according to the above each embodiment, the display device can project in midair the image displayed on the image display device 11.

Note that each of the collimating lens 131 and the light guide member 132 is formed by molding, for example, a material transparent to visible light, for example, a resin such as polymethyl methacrylate (PMMA), polycarbonate, or cycloolefin polymer.

Note that a cylindrical lens having positive power in the longer direction of the incident surface 14a may be arranged between the outgoing surface 132c of the light guide member 132 and the incident surface 14a of the light guide plate 14. In this case, since light beams from the image display device 11 are converged by the cylindrical lens with respect to the longer direction of the incident surface 14a, angles of the reflective surfaces of the prisms 133 of the light guide member 132 may be identical to one another. Alternatively, in a case where each prism of the light guide plate 14 is formed into a concave mirror as illustrated in FIG. 10, or each prism of the light guide plate 14 is formed into a corner mirror as illustrated in FIG. 11, angles of the reflective surfaces of the prisms 133 of the light guide member 132 may be identical to one another. Alternatively, as in the modification of the light guide plate 14 illustrated in FIG. 14, the light guide member 132 may be formed into a wedge shape such that the thickness between the diffusion surface 132b and the outgoing surface 132c of the light guide member 132 is smaller as it separates from the incident surface 132a. The light guide member 132 may be arranged such that as it separates from the incident surface 132a, the diffusion surface 132b approaches the incident surface 14a of the light guide plate 14. In this case, each prism may be formed on the outgoing surface 132c.

In addition, in the above each embodiment or modification, as another example of the image projection unit, a hologram sheet may be used in lieu of the image display device 11 and the collimating lens 13 (or the collimating lens 131 and the light guide member 132). The hologram sheet includes a display surface on which a hologram representing an image to be projected is displayed in a predetermined region. The hologram sheet may be arranged to face the incident surface 14a of the light guide plate 14 across the imaging lens 12. Also in this case, for example, when the hologram sheet is illuminated from the back side, the hologram sheet can generate parallel light beams having different directions according to locations of the respective points on the image to be projected. Therefore, also in this case, the display device can project an image in midair similarly to the above each embodiment.

Furthermore, in another modification of the above each embodiment, the image display device 11 may be arranged closer to the imaging lens 12 than the focal point of the imaging lens 12 is. In this case, the observer can observe a virtual image of the image displayed in the display region of the image display device 11. The virtual image appears to be located on the back side of the light guide plate 14. Note that especially in a case where the distance between the virtual image and the light guide plate 14 is short, for example, a case where the above distance is shorter than the distance between the image display device 11 and the imaging lens 12, the imaging lens 12 may be a concave lens.

In addition, in order to display the virtual image of the image displayed in the display region of the image display device 11, the virtual image appearing to be located on the back side of the light guide plate 14, the imaging lens 12 may be omitted. In this case, the image display device 11 may be arranged at a location separated from the incident surface 14a of the light guide plate 14 by a distance corresponding to a value obtained as follows. The distance between a light emission location on the light guide plate 14 and the incident surface 14a of the light guide plate 14 is divided by a product of a refractive index of the light guide plate 14 and a cosine of the angle between the light propagating inside the light guide plate 14 and the outgoing surface 14c. The obtained value is subtracted from the distance between the virtual image and the light guide plate 14 to obtain the above value. Note that in the case of using the slits 151 as in the first embodiment, the location of each slit 151 in the direction orthogonal to the incident surface 14a may be determined according to the location of the virtual image to be displayed. Similarly, in the case of setting angle α of the reflective surface of each prism 141 according to the location of an image to be formed as in the second embodiment, angle α of the reflective surface of each prism 141 may be set according to the location of the virtual image to be displayed. That is, as the prism 141 is farther from the incident surface 14a, angle α of the reflective surface of the prism 141 is smaller.

Furthermore, in another modification of the above each embodiment, the display device may include a plurality of image display devices 11. For example, the image display devices 11 are arranged at different locations. In addition, the image display devices 11 may be arranged such that directions of the image display devices 11 with respect to the incident surface 14a of the light guide plate 14 differ from each other. In addition, the image display devices 11 may display identical images or may display different images. Therefore, images displayed on the image display devices 11 are projected at different locations. Therefore, the display device can project a plurality of different images simultaneously at different locations.

In addition, in the above each embodiment or modification, the light guide plate 14 may not be formed into a flat-plate shape but may be formed into a plate shape in which the outgoing surface 14c is curved. Thus, for example, it is possible to arrange the light guide plate 14 along a member formed into a curved shape as a windshield of a vehicle. Therefore, degree of freedom in arrangement of the display device improves.

This display device can be used for various purposes. For example, this display device can be used for a head-up display or a digital signage system. In addition, the display device may be arranged such that the outgoing surface of the light guide plate is located on one of a floor surface, a wall surface or a ceiling surface.

As described, a person skilled in the art can make various changes according to an embodiment within a scope of the present invention.

DESCRIPTION OF SYMBOLS 1 to 8 display device
11 image display device
111, 112 partial region
12 imaging lens
121 sub-cylindrical lens
13 collimating lens
131 collimating lens
132 light guide member
132a incident surface
132b diffusion surface
132c outgoing surface
133 prism
14 light guide plate
14a incident surface
14b diffusion surface
14c outgoing surface
141 to 144 prism
15 mask
151 slit
152 diffusion member
16 prism sheet
161 prism
17-1 to 17-n projector
18 microlens array
181 microlens
19 corner reflector plate
191 corner reflector

The invention claimed is:

1. A display device comprising:
an image display device which has a display surface, the image display device configured to display an image to be projected on a predetermined region of the display surface;
a light guide plate which is formed of a transparent member and has a plate shape, the light guide plate including an incident surface that faces the image display device, and a plurality of deflectors that is arranged in a propagation direction of a light beam emitted from the predetermined region of the image display device and entering inside the light guide plate via the incident surface, each of the plurality of deflectors configured to cause one of light beams emitted from locations and light beams emitted in directions, the locations and the directions differing from each other in a direction orthogonal to a longer direction of the incident surface in the predetermined region of the image display device, to be emitted from an outgoing surface, which is one surface of the light guide plate, at angles different from each other in the propagation direction; and
a mask which is arranged to face the outgoing surface of the light guide plate, the mask configured to shut-off a light beam other than a light beam directed toward a predetermined viewpoint from among light beams emitted from the outgoing surface via each of the plurality of deflectors,
wherein
the image display device collimates light beams emitted from the predetermined region, in the direction orthogonal to the longer direction of the incident surface.

2. The display device according to claim 1, wherein the image display device includes:
a collimating member which is arranged between the image display device and the incident surface, the collimating member configured to collimate the light beams emitted from the predetermined region of the image display device, in the direction orthogonal to the longer direction of the incident surface.

3. The display device according to claim 1, further comprising an image forming device configured to form an image of the light beams emitted from the predetermined region of the image display device, at a predetermined location in a direction parallel to the longer direction of the incident surface.

4. The display device according to claim 3, wherein the image forming device comprises a cylindrical lens which is arranged between the image display device and the incident surface and has positive power in the longer direction of the incident surface.

5. The display device according to claim 1, wherein the mask has a slit provided for each of the plurality of deflectors, the slit configured to allow a light beam to pass through the slit, the light beam directed toward the predetermined viewpoint from each of the plurality of the deflectors.

6. The display device according to claim 5, wherein the mask includes a diffuser configured to diffuse a light beam on a plane including the propagation direction and a normal line of the outgoing surface, the light beam passing through the slit corresponding to each of the plurality of deflectors.

7. A display device comprising:
an image display device which has a display surface, the image display device configured to display an image to be projected on a predetermined region of the display surface; and
a light guide plate which is formed of a transparent member and has a plate shape, the light guide plate including an incident surface that faces the image display device, and a plurality of deflectors that is arranged in a propagation direction of a light beam emitted from the predetermined region of the image display device where the image is displayed and entering inside the light guide plate via the incident surface, each of the plurality of deflectors configured to cause one of light beams emitted from locations and light beams emitted in directions, the locations and the directions differing from each other in a direction orthogonal to a longer direction of the incident surface in the predetermined region of the image display device, to be emitted from an outgoing surface, which is one surface of the light guide plate, toward a predetermined viewpoint,
wherein
the image display device collimates light beams emitted from the predetermined region in the direction orthogonal to the longer direction of the incident surface.

8. The display device according to claim 7, wherein the image display device includes:
a collimating member which is arranged between the image display device and the incident surface, the collimating member configured to collimate the light beams emitted from the predetermined region of the image display device, in the direction orthogonal to the longer direction of the incident surface.

9. The display device according to claim 7, further comprising an image forming device configured to form an image of the light beams emitted from the predetermined region of the image display device, at a predetermined location in a direction parallel to the longer direction of the incident surface.

10. The display device according to claim 9, wherein the image forming device comprises a cylindrical lens which is arranged between the image display device and the incident surface and has positive power in the longer direction of the incident surface.

11. The display device according to claim 9, wherein the image forming device includes a plurality of lenses which is arranged between the image display device and the incident surface and arranged along the longer direction of the incident surface, each of the plurality of lenses having positive power in the longer direction of the incident surface.

12. The display device according to claim 11, wherein the image display device displays images that represent an identical subject viewed from the predetermined viewpoint, in partial regions of the predetermined region, the partial regions corresponding to the plurality of lenses, respectively.

13. The display device according to claim 9, wherein the image forming device is arranged to face the outgoing surface of the light guide plate, and the image forming device retroreflects a light beam on a plane parallel to the outgoing surface, the light beam emitted from inside the light guide plate via the outgoing surface.

14. The display device according to claim 7, wherein each of the plurality of deflectors comprises a prism which is provided on a surface of the light guide plate, opposite to the outgoing surface, and includes a reflective surface configured to reflect a light beam propagating inside the light guide plate toward the outgoing surface, and an angle between the reflective surface and the outgoing surface becomes greater as each of the plurality of the deflectors is located farther from the incident surface.

15. The display device according to claim 7, further comprising a lens array which is arranged to face the outgoing surface of the light guide plate, the lens array including, for each of the plurality of deflectors:
a first lens which is provided at a location where a first light beam passes, the first light beam emitted from a first partial region on the predetermined region of the image display device from among light beams emitted from the predetermined region of the image display device, the first light beam changed in direction by each of the plurality of deflectors, and emitted from the outgoing surface; and
a second lens which is provided at a location where a second light beam passes, the second light beam emitted from a second partial region on the predetermined region of the image display device, the second partial region differing from the first partial region in the direction orthogonal to the longer direction of the incident surface, the first lens and the second lens having power on a plane including the propagation direction of a light beam inside the light guide plate and a normal direction of the outgoing surface such that an imaging plane corresponding to an image displayed in the first partial region and an imaging plane corresponding to an image displayed on the second partial region differ from each other.

16. The display device according to claim 7, further comprising a prism array which is arranged to face the outgoing surface of the light guide plate, the prism array including, for each of the plurality of deflectors:
a first prism which is provided at a location where a first light beam passes, the first light beam emitted from a first partial region on the predetermined region of the image display device from among light beams emitted from the predetermined region of the image display device, changed in direction by each of the plurality of deflectors, and emitted from the outgoing surface; and
a second prism which is provided at a location where a second light beam passes, the second light beam emitted from a second partial region on the predetermined region of the image display device, the second partial region differing from the first partial region in the direction orthogonal to the longer direction of the incident surface, wherein
a direction of a refracting surface of the first prism and a direction of a refracting surface of the second prism are set such that an imaging plane corresponding to an image displayed on the first partial region and an imaging plane corresponding to an image displayed on the second partial region differ from each other.

17. A display device comprising:
an image display device which has a display surface, the image display device configured to display an image to be projected on a predetermined region of the display surface; and
a light guide plate which is formed of a transparent member and has a plate shape, the light guide plate including an incident surface that faces the image display device, and a plurality of deflectors that is arranged in a propagation direction of a light beam emitted from the predetermined region of the image display device and entering inside the light guide plate via the incident surface, each of the plurality of deflectors configured to cause one of light beams emitted from locations and light beams emitted in directions, the locations and the directions differing from each other in a direction orthogonal to a longer direction of the incident surface in the predetermined region of the image display device, to be emitted from an outgoing surface, which is one surface of the light guide plate, toward a predetermined viewpoint, and each of the plurality of deflectors configured to converge light beams emitted from the predetermined region of the image display device in a direction parallel to the longer direction of the incident surface and to form an image of the light beams at a predetermined location, wherein
the image display device collimates light beams emitted from the predetermined region, in the direction orthogonal to the longer direction of the incident surface.

18. The display device according to claim 17, wherein the image display device includes:
a collimating member which is arranged between the image display device and the incident surface, the collimating member configured to collimate the light beams emitted from the predetermined region of the image display device where the image is displayed, in the direction orthogonal to the longer direction of the incident surface.

19. The display device according to claim 17, wherein each of the plurality of deflectors comprises a prism which is provided on a surface of the light guide plate, opposite to the outgoing surface, the prism including a reflective surface formed to be concave with respect to the incident surface, the reflective surface configured to reflect a light beam propagating inside the light guide plate, toward the outgoing surface.

20. The display device according to claim 17, wherein each of the plurality of deflectors comprises a prism which is provided on a surface of the light guide plate, opposite to the outgoing surface, the prism including a reflective surface formed to have a corner mirror shape, the reflective surface configured to reflect a light beam propagating inside the light guide plate, toward the outgoing surface, and to retroreflect a light beam propagating inside the light guide plate on a plane parallel to the outgoing surface.

* * * * *